No. 775,372. PATENTED NOV. 22, 1904.
G. LANGEN.
COUNTER SHAFT WITH CHANGEABLE SPEED.
APPLICATION FILED JAN. 13, 1904.
NO MODEL.
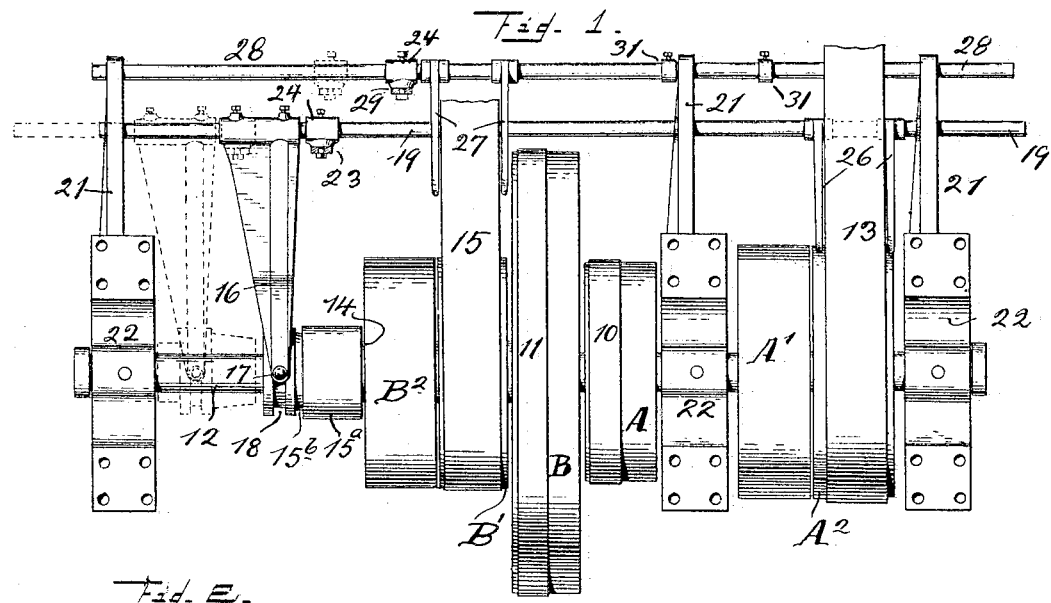
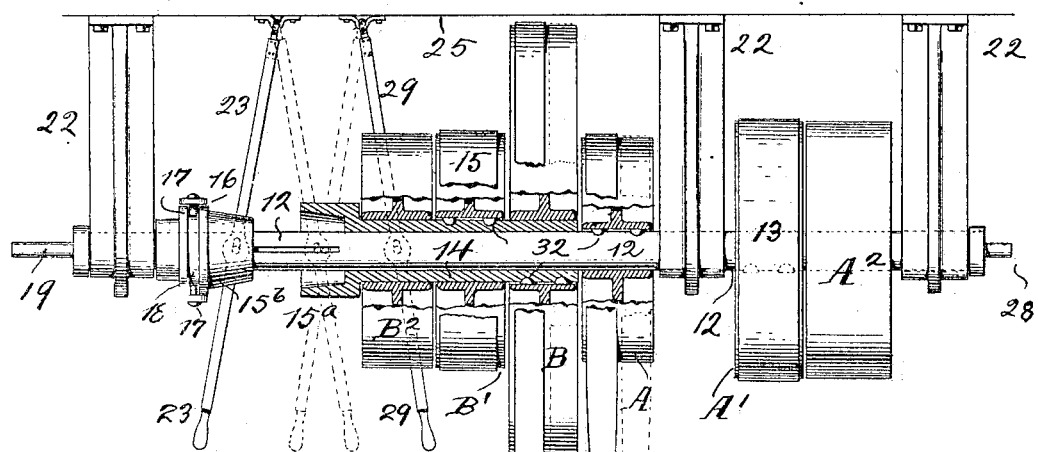
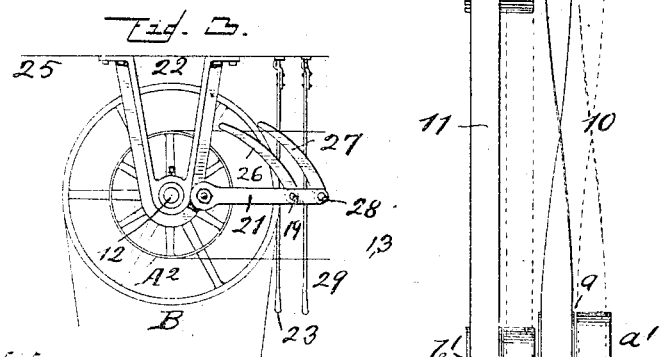
Witnesses
B. B. Quillen
Arthur Kline
Inventor
George Langen
by C. Spengel atty No. 775,372. Patented November 22, 1904.

UNITED STATES PATENT OFFICE.

GEORGE LANGEN, OF CINCINNATI, OHIO, ASSIGNOR TO THE CINCINNATI PLANER COMPANY, A FIRM OF CINCINNATI, OHIO, AND A CORPORATION OF OHIO.

COUNTER-SHAFT WITH CHANGEABLE SPEED.

SPECIFICATION forming part of Letters Patent No. 775,372, dated November 22, 1904.

Application filed January 13, 1904. Serial No. 188,847. (No model.)

*To all whom it may concern:*

Be it known that I, GEORGE LANGEN, a citizen of the United States, residing in the city of Cincinnati, in the county of Hamilton and State of Ohio, have invented a certain new and useful Counter-Shaft with Changeable Speed; and I do declare the following to be a clear, full, and exact description thereof, attention being called to the accompanying drawings, with the reference characters marked thereon, which form also a part of this specification.

This invention relates to means whereby the speed transmitted by a set of pulleys mounted upon a counter-shaft may be changed from a higher to a lower one, and vice versa.

It relates more particularly to such counter-shafts used for driving machine-tools using two speeds alternately—a slower one for doing the actual work and a faster one for reversing or returning parts again to working position. Conditions best fitting these premises are found in the customary planer, where the work is carried past a stationary cutting-tool by means of a reciprocating carriage, the tool acting upon the work while the carriage carries the same in one direction, after which the work is returned again to the starting-point, the tool having meanwhile been adjusted or fed ahead with reference to the work to take a new cut.

Of the two movements comprising an operation of the carriage the return travel may be the faster one and is usually so, because at that time no work is done, while the forward motion or working travel is necessarily a slower one, since at that time the tool is cutting. There is on the planer a pulley for each of these two speeds—one to drive the carriage forward while the tool cuts and another one to return the carriage again for the next cutting stroke. The pulley driving the carriage for the cutting stroke is usually the larger one and rotates slower, while the pulley which returns the carriage is smaller and rotates at higher speed. Each of these two pulleys has also a corresponding loose pulley mounted alongside of it, the belts being shifted automatically and so arranged that while one of the belts is driving the carriage the other belt is merely driving the loose pulley of the other set, which position is reversed at the end of each stroke, the belt driving being shifted from the tight pulley onto its loose mate, while the other belt engages the tight pulley in the other set. It will now be seen that the carriage is driven with two speeds—a slower one when the carriage is on its forward or cutting stroke and a higher one when the carriage is returned again after this stroke. As to this latter speed, no work being done on it, the conditions never vary, and the same may therefore be constant. As to the slower speed used for the working stroke, changes are desirable, since neither the work nor the material are always alike and lighter work or material cutting easier may permit the carriage to travel at a higher speed than if heavier work is done, thereby saving time and increasing the capacity of the machine-tool.

The principal object of my invention is therefore to provide a counter-shaft whereby the working pulley of the particular machine-tool may be driven at either one of two speeds, the return or reversing pulley being operated in the usual manner—that is, at constant speed which is higher than the working speed.

The invention consists of the construction and arrangement of parts whereby this object is attained and as hereinafter more fully described, and pointed out in the claims, and as illustrated in the accompanying drawings, in which—

Figure 1 is a plan view of a set of pulleys mounted upon a counter-shaft and all arranged as contemplated by my invention. Fig. 2 is a vertical elevation, with parts broken away, of the devices illustrated in Fig. 1, showing also in addition a set of pulleys driven by the counter-shaft shown in Fig. 1 and which set of pulleys may be the operating-pulleys of a suitable machine-tool—as a planer, for instance. Fig. 3 shows, at reduced scale, an end view of the counter-shaft.

Referring now more particularly to Fig. 2, *a* indicates the tight pulley on the machine-tool for operating the parts in one direction while active work is being done, said pulley being driven by a belt 10 from a pulley A on the counter-shaft, $b$ indicating the tight pulley for returning the parts operated by the other pulley, it being for such purpose driven by a belt 11 from a pulley B. No work being done at that time, this operation is at a higher speed than the operation of pulley $a$. The rotation of one being in reverse direction as against the other, it is necessary that one of the belts be twisted. In the premised condition of parts as shown the machine-tool is doing active work, for which purpose operating-pulley $a$ is driven from pulley A. Pulley B, which reverses the machine-tool, although rotating is not transmitting any motion at that time, since its belt engages the loose mate $b'$ of pulley $b$.

At the end of the active working motion of the machine-tool both belts are automatically shifted, belt 10 sliding onto loose pulley $a'$ and belt 11 passing over onto the tight pulley $b$, whereby the machine-tool is now reversed.

It will be noted that both pulleys A and B rotate uninterruptedly; but one only transmits motion at the time to the machine-tool and the motions transmitted being in opposite directions.

As generally arranged under present practice, pulley A, hereinafter called the "working pulley," and pulley B, hereinafter called the "reversing-pulley," are both mounted upon a counter-shaft and driven at constant speed from a line-shaft, (not shown,) the difference in speeds to be transmitted by each to the machine-tool being attained by arranging and proportioning correspondingly the relative sizes between the driving-pulleys A and B and the driven ones $a$ and $b$, respectively.

The counter-shaft was operated by a tight pulley upon it, connection being made to the line-shaft mentioned, a loose pulley being mounted alongside of it to stop the counter-shaft when the machine-tool driven by it is not used. This arrangement I retain, 12 being the counter-shaft, A' the tight pulley, and A² its loose mate, connection being made to the line-shaft by means of a belt 13. However, instead of rotating the two transmitting-pulleys A and B by means of this counter-shaft on which they are mounted I rotate one only, A in this case, it being for such purpose keyed to such shaft. The other pulley, B, is keyed upon a sleeve 14, loosely mounted upon the counter-shaft. It is rotated by means of a tight pulley B', a loose one, B², being also provided alongside of it for use when the counter-shaft is not in operation, both of these pulleys being also mounted upon the same sleeve. Connection is made by means of a belt 15 to the same line-shaft from which pulley A' is driven. Since these two pulleys A and B rotate always simultaneously when the counter-shaft is used, to carry out the intended operation of the planer and are both constantly driven from pulleys mounted on the same line-shaft, the fact that pulley B is independently mounted on sleeve 14 is of no further significance as regards the purpose of its mere rotation; but such sleeve is needed as part of the means to carry out the object of my invention, such object, as before stated, being to give the working pulley A a higher speed when the nature of the work or material permits such, the adjustment for such purpose being had before such particular work is started, after which the operation with reference to pulleys $a$ and $b$ on the tool is again the same, only that the speed of pulley $a$ has meanwhile been increased. The first step toward carrying out my invention after providing this sleeve 14 is to cause pulley B' to rotate at a speed higher than pulley A', which higher speed is readily obtained by arranging the sizes accordingly between pulley B' and its driver on the line-shaft. All that is necessary now is to lock sleeve 14 to counter-shaft 12, belt 13, which drives pulley A', being shifted onto loose pulley A², as shown in Fig. 1. The arrangement of the adjusting mechanism is such that this locking of the sleeve to the counter-shaft and the shifting of belt 13 occur simultaneously. Such adjustment being accomplished and sleeve 14 locked to the counter-shaft, both rotate now together, the sleeve driven by pulley B' rotating pulley B and also shaft 12 with pulley A on it, the difference being, however, that this latter is now driven at the higher speed of pulley B' as transmitted through sleeve 14. This higher speed is practically the speed of reversing-pulley B, since all these pulleys rotate now together, receiving motion from the same source—to wit, the higher-speeded belt 15 and pulley B'. However, as transmitted to the planer and received by pulley $a$ on it it is not as high as such reversing speed, due to the proportions of pulleys A and $a$; but it is correspondingly higher than before the adjustment and while pulley A was driven by the counter-shaft alone and as the same was rotated by the slower rotating pulley A'. I proceed now to describe the mechanical means for the adjustment from one speed to another.

As to the means for locking sleeve 14 to counter-shaft 12 any suitable clutch mechanism will serve, locking either positively by mechanical devices or by mere frictional contact. This latter method has here been selected, and of the two complementary members of the clutch mechanism one, 15ª, is provided at the end of sleeve 14, while the other, 15ᵇ, is mounted on shaft 12. This mounting is in the usual manner and such that by groove and feather, key or spline, the member is connected for rotation to shaft 12, but free to slide longitudinally thereon to engage the the other clutch member or break contact with it. A forked arm 16, engaging this clutch member in a manner which does not interfere with its rotation, as by pins 17 and groove 18, is used for shifting this clutch member to operate the clutch. This arm is attached to a shifter-rod 19, slidably supported in arms 21, attached in a suitable manner. By preference they project from the bearings or hangers 22, which support the counter-shaft. This shifter-rod is manipulated by the usual hand-lever 23, connected to it by a coupling 24 and supported from ceiling 25. 26 26 are the belt-shifter arms carried by this same rod for the purpose of shifting belt 13.

27 27 are belt-shifting arms for shifting belt 15. They are carried on a shifter-rod 28, supported like the other one on arms 21 and manipulated by a similar lever 29, similarly attached and supported.

31 31 are stops to limit the movement of this rod in either direction.

32 represents the keys which hold the tight pulleys.

I will now recapitulate in short the operation and manipulation of the parts for adjusting the counter-shaft to either one of its speeds, the counter-shaft being supposed to be at rest, its belts 13 and 15 being each on their respective loose pulleys $A^2$ and $B^2$ and the general line-shaft being of course in operation. For the usual or slower speed of working pulley A and planer-pulley $a$ belt 13 is shifted onto pulley A' by means of lever 23 and belt 15 is shifted onto pulley B' by means of lever 29, parts being in a position as shown in Fig. 2. Working pulley A is driven by pulley A' and counter-shaft 12, while reversing-pulley B is driven by pulley B' and sleeve 14.

For the higher speed of working pulley A and planer-pulley $a$ lever 23 is moved to the position shown in dotted lines in Fig. 2, causing engagement of the clutch members and shifting belt 13 onto its loose pulley, bringing parts into a position as shown in Fig. 1. Lever 29 is not manipulated, and belt 15 is left where it was. This manipulation disconnects the counter-shaft from the slower pulley A' and locks it to sleeve 14, driven at a higher speed by pulley B'. The working pulley A being tight on the shaft necessarily rotates with it at this higher speed.

The speed of reversing-pulley B remains the same in either event, it being driven in both cases from sleeve 14. To set the entire counter-shaft at rest from this latter adjustment, it is only necessary to shift belt 15 onto its loose pulley, moving for such purpose lever 29 to the position shown in dotted lines in Fig. 2.

Having described my invention, I claim as new—

1. The combination of a counter-shaft, a tight pulley and a loose pulley mounted thereon, a rigidly-attached transmitting-pulley also mounted on the counter-shaft, a sleeve loosely mounted on the counter-shaft, a tight pulley on this sleeve to rotate the same, such pulley being driven at a speed different from the speed of the tight pulley on the counter-shaft, means for detachably locking the sleeve to the counter-shaft, a belt-shifter to move the belt from the tight pulley on the counter-shaft onto its loose mate and means whereby these sleeve-locking means and this belt-shifter are operatively connected in a manner so as to move together.

2. The combination of a counter-shaft, a transmitting-pulley rigidly mounted thereon, a sleeve loosely carried on the counter-shaft, a transmitting-pulley rigidly mounted on the sleeve, a driving-pulley for the counter-shaft and a driving-pulley for the sleeve, both of them operating at a speed different from each other, a loose pulley for each, means for shifting the belts of these pulleys, mechanism to operatively connect the sleeve to the counter-shaft to drive the latter from the former, or to disconnect it therefrom and means to positively manipulate this mechanism.

In testimony whereof I hereunto set my signature in the presence of two witnesses.

GEORGE LANGEN.

Witnesses:
BERTRAM B. QUILLEN,
C. SPENGEL.